United States Patent
Smith (10) Patent No.: US 7,567,198 B2
(45) Date of Patent: Jul. 28, 2009

(54) SUBAPERTURE 3D IMAGING

(75) Inventor: Brian H. Smith, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 646 days.

(21) Appl. No.: 11/410,401

(22) Filed: Apr. 25, 2006

(65) Prior Publication Data

US 2007/0247461 A1   Oct. 25, 2007

(51) Int. Cl.
*G01S 13/90* (2006.01)
*G06T 15/20* (2006.01)

(52) U.S. Cl. .................. 342/25 A; 342/25 D; 342/25 F; 342/192; 342/196; 345/427

(58) Field of Classification Search ............... 342/25 R, 342/25 A–25 F, 191–192, 194–196; 345/427
See application file for complete search history.

(56) References Cited

U.S. PATENT DOCUMENTS

| | | | | |
|---|---|---|---|---|
| 4,771,287 A | * | 9/1988 | Mims | 342/25 A |
| 4,963,877 A | * | 10/1990 | Wood et al. | 342/25 A |
| 5,969,662 A | * | 10/1999 | Hellsten | 342/25 A |
| 6,111,535 A | * | 8/2000 | Smith | 342/25 A |
| 6,426,718 B1 | * | 7/2002 | Ridgway | 342/160 |
| 7,145,498 B2 | * | 12/2006 | Cho et al. | 342/25 R |
| 7,245,250 B1 | * | 7/2007 | Kalayeh | 342/25 R |
| 7,391,357 B1 | * | 6/2008 | Doerry et al. | 342/25 F |
| 2007/0159376 A1 | * | 7/2007 | Abatzoglou et al. | 342/25 R |
| 2007/0247461 A1 | * | 10/2007 | Smith | 345/427 |

FOREIGN PATENT DOCUMENTS

| | | | |
|---|---|---|---|
| EP | 544546 A2 | * | 6/1993 |
| JP | 62116282 A | * | 5/1987 |
| JP | 04244989 A | * | 9/1992 |
| WO | WO 8606177 A1 | * | 10/1986 |
| WO | WO 9711387 A1 | * | 3/1997 |
| WO | PCT/US97/07835 A1 | | 11/1997 |
| WO | WO 2005001507 A1 | * | 1/2005 |

OTHER PUBLICATIONS

Jain, Atul, "SAR/ISAR Imaging of a Non-Uniformly Rotating Target", IEEE Transactions on Aerospace and Electronics Systems, 28, 1992.

* cited by examiner

*Primary Examiner*—John B Sotomayor (57) ABSTRACT

Embodiments of methods, apparatuses, and articles for receiving phase history data collected from synthetic aperture radar imaging of a terrain, dividing the received phase history data into a plurality of subsets corresponding to a plurality of subaperture intervals, computing for each of a plurality of points of the terrain, a contribution of each of the plurality of subaperture intervals, each contribution including a magnitude and a phase calculated by interpolating the subaperture interval, using the corresponding subset of phase history interval data, and based at least in part on an arbitrary reference surface's elevation at the point, summing for each of the plurality of points of the terrain, the contributions of the plurality of subaperture intervals, and forming an image of the terrain based at least in part on the summed contributions of the plurality of subaperture intervals to the plurality of points of the terrain, are described herein.

20 Claims, 4 Drawing Sheets

SUBAPERTURE 3D IMAGING

FIELD OF THE INVENTION

The present invention relates to the field of image formation, in particular, to methods and apparatuses for forming an image of a surface based at least in part on the summed contributions of subaperture intervals facilitated by an arbitrary reference surface.

BACKGROUND OF THE INVENTION

Synthetic aperture radar imaging provides the ability to form high-resolution images of a target terrain under varying conditions. To form images, RF energy is transmitted and collected throughout a flight path, the path comprising a "synthetic" aperture. The collected energy is stored as phase history data. Methods for forming an image from the collected data often use a focus target plane (FTP), an imaginary flat surface approximating the terrain being imaged. Portions of the imaged terrain located within the FTP may appear focused, and portions outside of the FTP may appear out-of-focus.

Forming an image from the collected data is a computationally intensive process. A generalized matched filter approach, which requires knowledge of the target elevation and does not rely on a single FTP, requires on the order of N^2 computations, where N is the number of resolution cells in the image. Other image formation operations, such as polar format processing and range migrations are able to form the image with a single FTP with on the order of N*log(N) computations by using a Fast Fourier Transformation. The images formed by these other operations, however, appear out-of-focus at portions of the terrain above or below the FTP. Some compensation for the out-of-focus portions can be made through the use of spatially-variant autofocus, which divides an image into a series of patches, raising or lowering the FTP on individual patches. Use of spatially-variant autofocus, however, can introduce sharp discontinuities in the magnitude and phase information at the edges of the patches. This can introduce potential difficulties in using the data for techniques that exploit phase information such as Coherent Change Detection (CCD) and interferometric elevation extraction.

BRIEF DESCRIPTION OF THE DRAWINGS

The present invention will be described by way of exemplary embodiments, but not limitations, illustrated in the accompanying drawings in which like references denote similar elements, and in which.

SUMMARY

Illustrative embodiments of the present invention include, but are not limited to, methods and apparatuses for receiving phase history data collected from synthetic aperture radar imaging of a terrain, dividing the received phase history data into a plurality of subsets corresponding to a plurality of subaperture intervals, computing for each of a plurality of points of the terrain, a contribution of each of the plurality of subaperture intervals, each contribution of a subaperture interval to a point including a magnitude and a phase calculated by interpolating the subaperture interval, using the corresponding subset of phase history interval data, and based at least in part on an arbitrary reference surface's elevation at the point, summing for each of the plurality of points of the terrain, the contributions of the plurality of subaperture intervals, and forming an image of the terrain based at least in part on the summed contributions of the plurality of subaperture intervals to the plurality of points of the terrain. The features, functions, and advantages of the illustrative embodiments can be achieved independently in various embodiments of the present invention or may be combined in yet other embodiments.

DETAILED DESCRIPTION OF EMBODIMENTS OF THE INVENTION

Various aspects of illustrative embodiments of the present invention will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
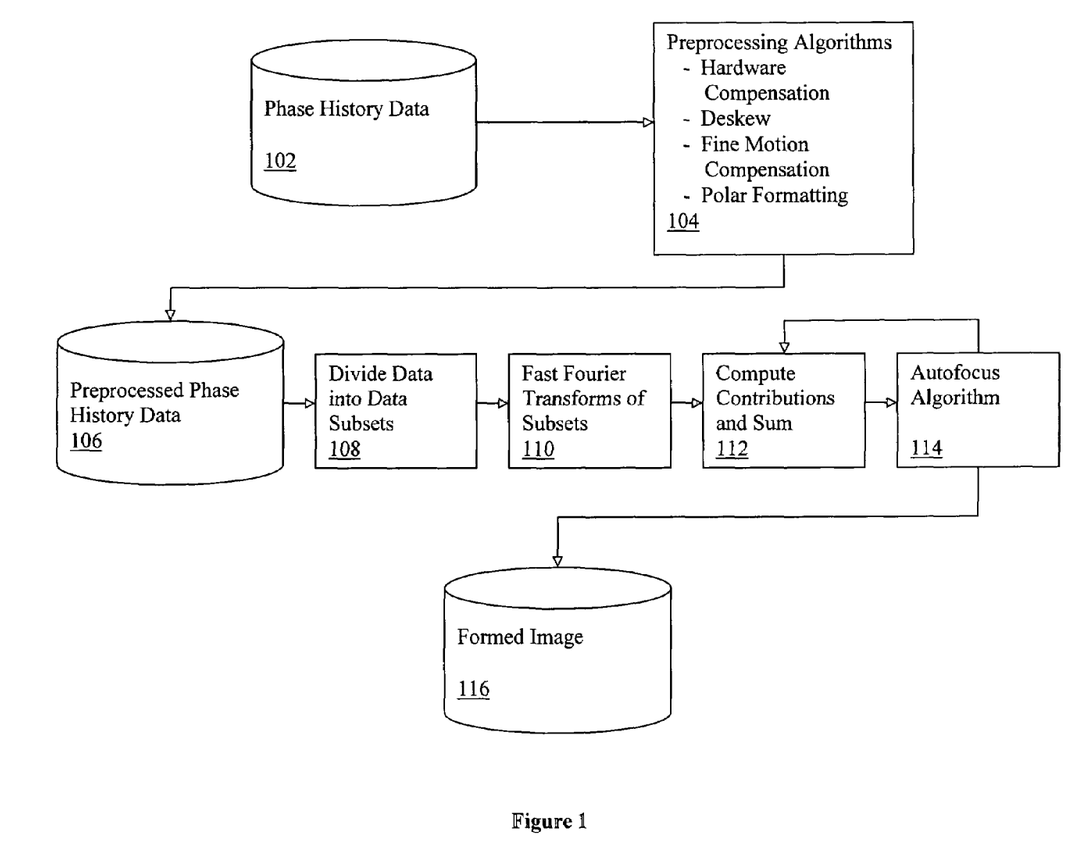
FIG. 1 illustrates an overview of the present invention, in accordance with various embodiments.

FIG. 1 illustrates an overview of the present invention, in accordance with various embodiments. As illustrated, for the embodiments, a collection of phase history data 102 may be input for one or more preprocessing operations 104, such as hardware compensation operations, Deskew processing operations, fine motion compensation operations, and polar-to-rectangular resampling (polar formatting) operations. The resulting collections of preprocessed phase history data 106 may then be divided into a plurality of subsets 108 corresponding to a plurality of subaperture intervals. Fast Fourier Transformations (FFTs) 110 may then be performed on the subsets. The results of the FFTs may then be interpolated based on the estimated elevation of an arbitrary reference surface approximating the terrain elevation, the interpolating to compute for each point of terrain a contribution of each subaperture interval, and the contributions of each subaperture interval for each point of terrain may be summed 112. An autofocus operation 114 may then evaluate multiple arbitrary reference surfaces by repeatedly interpolating and summing contributions of subaperture intervals based on each of the multiple arbitrary reference surfaces. Based on the interpolating and summing 112, an image 116 may be formed.

In various embodiments, the data and components illustrated by FIG. 1 may be located on the same computing device, or may be located on a plurality of computing devices, in some embodiments connected by a network. The computing devices may include any sort of devices known in the art, such as PCs, workstations, servers, mainframes, supercomputers, embedded systems, and mobile devices. In one embodiment, a computing device having at least some of the data and components illustrated by FIG. 1 may be integrated into or coupled to the synthetic aperture radar which captures the phase history data.

Exemplary networks connecting computing devices may also be of any sort known in the art, including Ethernet, Bluetooth, and 802.11 networks. Such networks may also utilize any sort of communication protocol known in the art, such as TCP/IP or ATM. In one embodiment, where the data and components illustrated by FIG. 1 are located on a plurality of computing devices, but where two or more of the computing devices are not connected by a network connection, data may be written onto a storage medium by one computing device and read from the medium by another device. The storage media may be of any sort known in the art, including floppy diskettes, CDs, and thumb drives.

Figure 3A:
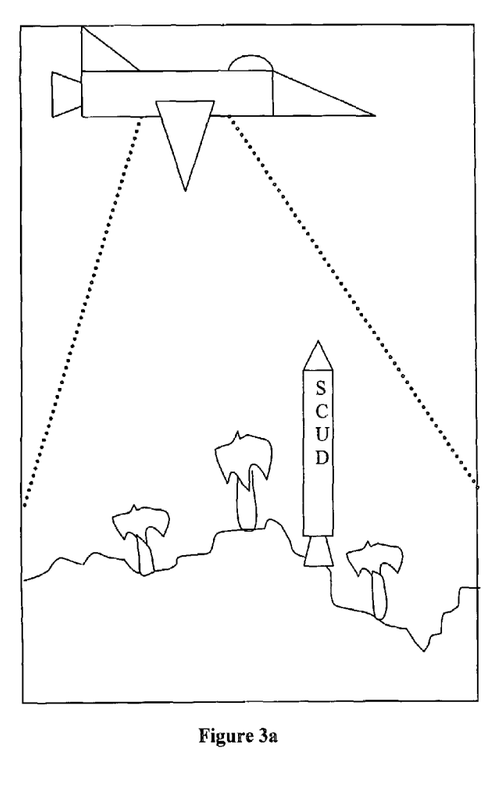
FIGS. 3*a*-3*b* illustrate an exemplary acquisition of phase history data collected using synthetic aperture radar imaging of a terrain, and an image of the terrain formed based on selected operations of embodiments of the present invention.

As shown, synthetic aperture radar (SAR) phase history data 102 comprises a collection of data representing an imaged terrain. An exemplary acquisition of phase history data 102 is illustrated by FIG. 3a. An airborne or spaceborne platform such as a fighter, bomber, helicopter, or any other airborne platform known in the art may fly over a target terrain and transmit and receive RF energy throughout its flight path. Received RF energy may then be collected, in some embodiments using dechirp-on-receive stretch processing, and stored as phase history data 102. Methods and apparatuses for acquiring, processing, and storing phase history data 102 are well known in the art, and accordingly need not be described further.

Referring again to FIG. 1, the collected phase history 102 may be preprocessed upon receipt. Exemplary pre-processing operations 104 include hardware compensation and fine motion compensation operations capable of removing hardware distortions and fine motion effects from the formed image 116, range Deskew processing operations for removal of residual video phase, and polar-to-rectangular processing (polar formatting), which may involve stabilizing the phase history data 102 to an output reference point and resampling the data 102 onto a rectangular grid. This polar formatting operation may be performed with respect to a given focus target plane (FTP) and may compensate for range cell migration. Preprocessing operations 104 are known in the art, and therefore will not be described further.

In various embodiments, the component operations of dividing preprocessed data 106 into subsets 108, performing FFTs 110, computing contributions and summing the contributions 112, and executing an autofocus operation 114 may comprise an approximation to a matched filter. For example, an image 116 may be formed on an arbitrary reference surface (which also may be referred to as a "Focus Target Membrane," or "FTM") using a matched filter. In such embodiments, the preprocessed phase history data 106 may be denoted by $G(k_x,k_y)$, where $k_x$ is the fast-time index and $k_y$ is the slow-time index, the preprocessing 104 having been performed with respect to an FTP. If the elevation of the FTM above or below the FTP is given by the function $H(x,y)$, where x and y are the slant-plane coordinates of a point of the imaged terrain, a two-dimensional matched filter may be implemented to estimate the return from scatterer objects (objects deflecting the RF energy) located on the FTM. A matched filter may be approximated by:

$$g(x,y) = \sum_{k_x,k_y} G(k_x,k_y)\exp(ia_0 H(x,y)h(k_x,k_y) + ixk_x + iyk_y)$$

where $a_0$ is a known constant, and $h(k_x,k_y)$ is the elevation of the airborne platform above the slant-plane at the time at which the phase history data 102 at $k_x$ and $k_y$ was collected. The function $h(k_x,k_y)$ may capture the effect of airborne platform motion, such as acceleration and turbulence, and may vary slowly. The summation may be divided into data subsets 108 corresponding to subaperture intervals, such that $h(k_x,k_y)$ can be approximated by performing an expansion around the center of each subaperture interval, c:

$$h(k_x,k_y) \approx h(k_x,k_y)\Big|_c + \frac{\partial h(k_x,k_y)}{\partial k_x}\Big|_c k_x + \frac{\partial h(k_x,k_y)}{\partial k_y}\Big|_c k_y$$

The matched filter may then be approximated by a summation over the subaperture intervals:

$$g(x,y) = \sum_s g_s(x,y)$$

where each subaperture may be approximated as:

$$g_s(x,y) = \sum_{k_x,k_y \in interval} G(k_x,k_y)$$
$$\exp\left(ia_0 H(x,y)\left[h(k_x,k_y)\Big|_{c(s)} + \frac{\partial h(k_x,k_y)}{\partial k_x}\Big|_{c(s)} k_x + \frac{\partial h(k_x,k_y)}{\partial k_y}\Big|_{c(s)} k_y\right] + ixk_x + iyk_y\right)$$

where $c(s)$ is the center-point of the subaperture interval with index s. The function in the integrand is now purely linear in $k_x$ and $k_y$. An FFT operation 110 may next be used to compute a Fourier transform of $G(k_x,k_y)$ over each subaperture interval:

$$g_s^0(x,y) = FFT(G(k_x,k_y))$$

The contribution of each subaperture interval may then be computed by interpolating the result of each FFT 110:

$$g_s(x, y) = \exp(ia_0 H(x, y) h(k_x, k_y)|_{c(s)})$$

$$g_s^0\left(x + a_0 H(x, y) \frac{\partial h(k_x, k_y)}{\partial k_x}\bigg|_{c(s)}, y + a_0 H(x, y) \frac{\partial h(k_x, k_y)}{\partial k_y}\bigg|_{c(s)}\right)$$

Approximating the function $h(k_x, k_y)$ (the elevation of the airborne platform) with a Taylor series may introduce residual phase errors. These residual phase errors may contribute to broadband multiplicative noise of the image 116. The number of subaperture intervals chosen may be sufficient to limit the operation's contribution to multiplicative noise.

As illustrated, an image 116 may be formed using an arbitrary reference surface/FTM characterized by H(x,y), through the following operation:

1. Divide preprocessed phase history data 106 into a plurality of subsets 108 corresponding to a plurality of subaperture intervals. The number of subsets chosen may be sufficient to reduce flaws in the formed image 116, such as the above described multiplicative noise, below an intolerance threshold metric (for example, a maximum amount of multiplicative noise). Further, the subaperture intervals may be chosen to overlap.
2. Perform an FFT 110 on each subset corresponding to each subaperture interval. These FFT results may be cached in memory of the computing device or in memory of a connected device for future processing.
3. For each point (x,y) of the imaged terrain, interpolate each subaperture interval to compute the magnitude and phase associated with the contribution 112 from that subaperture interval, based at least in part on an arbitrary reference surface's (FTM's) elevation at the point (x,y). The FTM may approximate the elevations of the imaged terrain. In other embodiments, interpolation may also be performed by warping each subaperture interval, based on the function H(x,y).
4. For each point, sum the complex-valued contribution 112 of each of the plurality of subsets corresponding to the plurality of subaperture intervals.

In some embodiments, the integration angle and the fractional bandwidth conditions of SAR imaging are small enough so that only a single interval in $k_x$ (fast-time) may be needed. For other embodiments, such as Ultrawideband SAR imaging, multiple intervals in $k_x$ may be required. In many instances, $h(k_x, k_y)$ can be approximated as a quadratic function in $k_y$:

$$h(k_x, k_y) = a_1 k_y^2$$

where $a_1$ is a constant. The operation may be implemented using the approximations:

$$\frac{\partial h(k_x, k_y)}{\partial k_x} = 0$$

$$\frac{\partial h(k_x, k_y)}{\partial k_y} = 2 a_1 k_y$$

In an autofocus operation 114, the image 116 may be reformed multiple times using a number of different arbitrary reference surfaces/FTMs. Changing the FTM may be achieved by repeating the interpolating and summing operations 112, using the cached results of the FFTs 110 of the subaperture intervals.

In various embodiments, an FTM may be generated by estimating elevations of each of the plurality of points of the terrain based on statistics describing the phase history data 102. The FTM may then be evaluated based at least partially on image 116 statistics. The FTM may then be changed and regenerated if desired based, for example, on the results of the evaluation.

Referring again to FIG. 1, the formed image 116 may approximate an image formed by a matched filter. Image 116 may, however, be formed in N*log(N) computations, rather than in the N^2 computations of the matched filter. Further, the use of the FTM in forming image 116 may create an image with fewer out-of-focus appearing portions, as the image 116 will appear focused at the elevations of the FTM, which approximate the elevations of the imaged terrain. Image 116 may then be stored on the computing device performing some of the above operations, or may be transmitted to some other device or written to some storage medium. An exemplary image 116 is depicted by FIG. 3.

Figure 2:
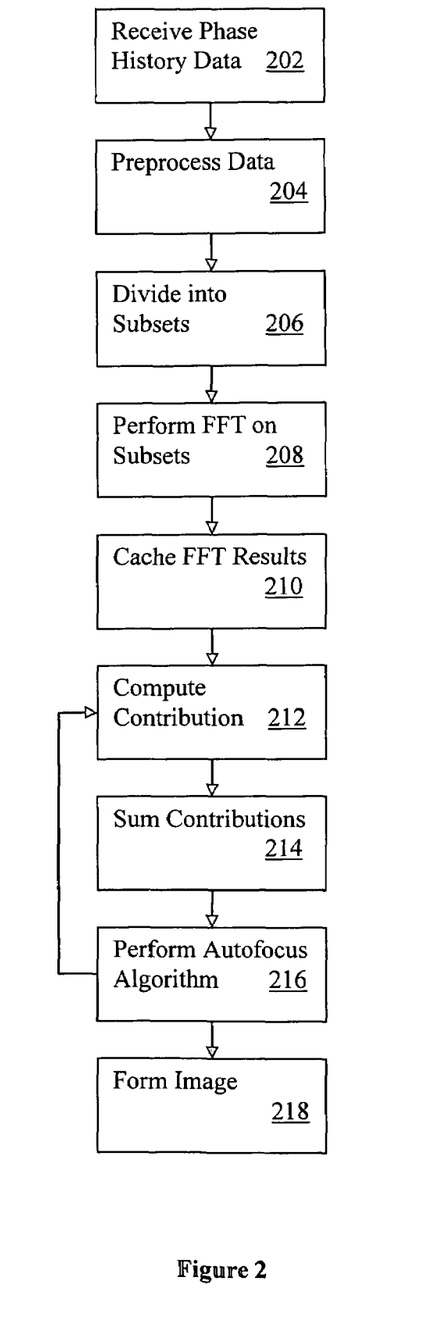
FIG. 2 illustrates a flowchart view of selected operations of the present invention, in accordance with various embodiments.

FIG. 2 illustrates a flowchart view of selected operations of the present invention, in accordance with various embodiments. As shown, image forming methods may receive a collection of synthetic aperture radar (SAR) phase history data, block 202, representing an imaged terrain. An airborne or spaceborne platform such as a fighter, bomber, helicopter, or any other airborne platform known in the art may fly over a target terrain and transmit and receive RF energy throughout its flight path. Received RF energy may then be collected, in some embodiments using dechirp-on-receive stretch processing, and stored as phase history data. Methods for acquiring, processing, and storing phase history data are well known in the art, and accordingly need not be described further.

In various embodiments, the collected phase history may be preprocessed upon receipt, block 204. Exemplary preprocessing operations include hardware compensation and fine motion operations capable of removing hardware distortions and fine motion effects from the formed image, Deskew processing operations, and polar-to-rectangular processing (polar formatting), which may involve stabilizing the phase history data to an output reference point and resampling the data onto a rectangular grid. This polar formatting operation may be performed with respect to a given focus target plane (FTP) and may compensate for range cell migration. Preprocessing operations are also well known in the art, and therefore will not be described further.

In various embodiments, the selected operations of dividing preprocessed phase history data into subsets, block 206, performing FFTs on the subsets, block 208, computing contributions, block 212, summing the contributions, block 214, and performing an autofocus operation, block 216, may comprise an approximation to a matched filter. For example, an image may be formed, block 218, on an arbitrary reference surface (which also may be referred to as a "Focus Target Membrane," or "FTM") using a matched filter. In such embodiments, the preprocessed phase history data may be denoted by $G(k_x, k_y)$, where $k_x$ is the fast-time index and $k_y$ is the slow-time index, the preprocessing having been performed, block 204, with respect to an FTP. If the elevation of the FTM above or below the FTP is given by the function H(x,y), where x and y are the slant-plane coordinates of a point of the imaged terrain, a two-dimensional matched filter may be implemented to estimate the return from scatterer objects (objects deflecting the RF energy) located on the FTM. A matched filter may be approximated by:

$$g(x, y) = \sum_{k_x, k_y} G(k_x, k_y) \exp(ia_0 H(x, y) h(k_x, k_y) + ixk_x + iyk_y)$$

where $a_0$ is a known constant, and $h(k_x,k_y)$ is the elevation of the airborne platform above the slant-plane at the time at which the phase history data at $k_x$ and $k_y$ was collected. The function $h(k_x,k_y)$ may capture the effect of airborne platform motion, such as acceleration and turbulence, and may vary slowly. The summation may be divided into data subsets, block 206, corresponding to subaperture intervals, such that $h(k_x,k_y)$ can be approximated by performing an expansion around the center of each subaperture interval, c:

$$h(k_x, k_y) \approx h(k_x, k_y)\Big|_c + \frac{\partial h(k_x, k_y)}{\partial k_x}\Big|_c k_x + \frac{\partial h(k_x, k_y)}{\partial k_y}\Big|_c k_y$$

The matched filter may then be approximated by a summation over the subaperture intervals:

$$g(x, y) = \sum_s g_s(x, y)$$

where each subaperture may be approximated as:

$$g_s(x, y) = \sum_{k_x, k_y \in interval} G(k_x, k_y)$$
$$\exp\left(ia_0 H(x, y)\left[h(k_x, k_y)\Big|_{c(s)} + \frac{\partial h(k_x, k_y)}{\partial k_x}\Big|_{c(s)} k_x + \frac{\partial h(k_x, k_y)}{\partial k_y}\Big|_{c(s)} k_y\right] + ixk_x + iyk_y\right)$$

where c(s) is the center-point of the subaperture interval with index s. The function in the integrand is now purely linear in $k_x$ and $k_y$. An FFT may then be performed on the subsets, block 208, which may be used to compute a Fourier transform of $G(k_x,k_y)$ over each subaperture interval:

$$g_s^0(x,y) = FFT(G(k_x, k_y))$$

The contribution of each subaperture interval may then be computed by interpolating the result of each FFT to compute contributions, block 212:

$$g_s(x, y) = \exp(ia_0 H(x, y) h(k_x, k_y)|_{c(s)})$$
$$g_s^0\left(x + a_0 H(x, y)\frac{\partial h(k_x, k_y)}{\partial k_x}\Big|_{c(s)}, y + a_0 H(x, y)\frac{\partial h(k_x, k_y)}{\partial k_y}\Big|_{c(s)}\right)$$

Approximating the function $h(k_x,k_y)$ (the elevation of the airborne platform) with a Taylor series may introduce residual phase errors. These residual phase errors may contribute to broadband multiplicative noise of the image. The number of subaperture intervals chosen, block 206, may be sufficient to limit the operation's contribution to multiplicative noise.

As illustrated, an image may be formed, block 218, using an arbitrary reference surface/FTM characterized by H(x,y), through the following operation:

1. Divide preprocessed phase history data into a plurality of subsets, block 206, corresponding to a plurality of subaperture intervals. The number of subsets chosen may be sufficient to reduce flaws in the formed image, such as the above described multiplicative noise, below an intolerance threshold metric (for example, a maximum amount of multiplicative noise). Further, the subaperture intervals may be chosen to overlap.
2. Perform an FFT on each subset corresponding to each subaperture interval, block 208. These FFT results may be cached in memory of the computing device or in memory of a connected device for future processing, block 210, in some embodiments.
3. For each point (x,y) of the imaged terrain, interpolate each subaperture interval to compute the magnitude and phase associated with the contribution, block 212, from that subaperture interval, based at least in part on an arbitrary reference surface's (FTM's) elevation at the point (x,y). The FTM may approximate the elevations of the imaged terrain. In other embodiments, interpolation may also be performed by warping each subaperture interval, based on the function H(x,y).
4. For each point, sum the complex-valued contribution of each of the plurality of subsets corresponding to the plurality of subaperture intervals, block 214.

In some embodiments, the integration angle and the fractional bandwidth conditions of SAR imaging are small enough so that only a single interval in $k_x$ (fast-time) may be needed. For other embodiments, such as Ultrawideband SAR imaging, multiple intervals in $k_x$ may be required. In many instances, $h(k_x,k_y)$ can be approximated as a quadratic function in $k_y$:

$$h(k_x, k_y) = a_1 k_y^2$$

where $a_1$ is a constant. The operation may be implemented using the approximations:

$$\frac{\partial h(k_x, k_y)}{\partial k_x} = 0$$
$$\frac{\partial h(k_x, k_y)}{\partial k_y} = 2a_1 k_y$$

Image forming methods may next perform an autofocus operation, block 216, as it may be desirable to reform the image multiple times using a number of different arbitrary reference surfaces/FTMs. Changing the FTM may be achieved by repeating the interpolating and summing operations, blocks 212 and 214, using the cached results of the FFTs of the subaperture intervals.

In various embodiments, an FTM may be generated by estimating elevations of each of the plurality of points of the terrain based on statistics describing the phase history data (not shown). The FTM may then be evaluated based at least partially on image statistics (not shown). The FTM may then be changed and regenerated if desired based, for example, on the results of the evaluation.

As shown, the image may then be formed, block 218, and the image may approximate an image formed by a matched filter. The image may, however, be formed in N*log(N) computations, rather than in the N^2 computations of the matched filter. Further, the use of the FTM in forming the image may create an image with fewer out-of-focus appearing portions, as the image will appear focused at the elevations of the FTM, which approximate the elevations of the imaged terrain. The image may then be stored on the computing device performing some of the above operations, or may be transmitted to some other device or written to some storage medium.

Figure 3B:
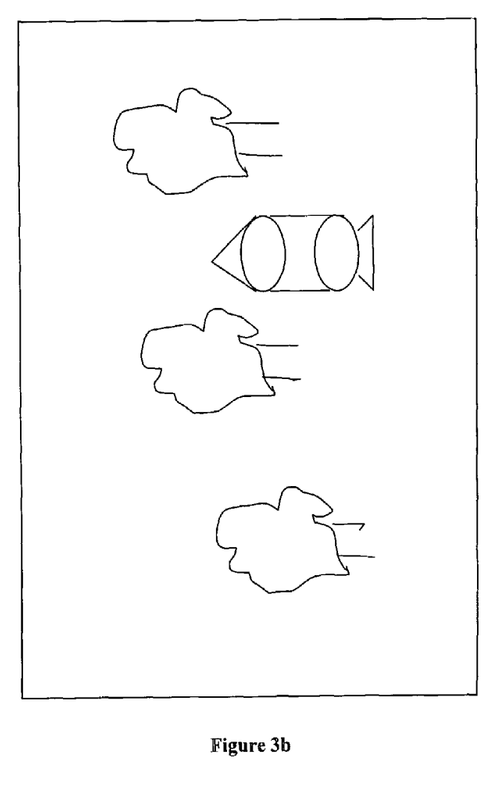

FIGS. 3a-3b illustrate an exemplary acquisition of phase history data collected using synthetic aperture radar imaging of a terrain, and an image of the terrain formed based on selected operations of embodiments of the present invention.

FIG. 3a illustrates an airborne platform flying over a target terrain and imaging that terrain with an SAR by transmitting and receiving RF energy (illustrated as dotted lines). As can be seen, the terrain imaged is an arbitrarily varying terrain having a number of features, such as the trees and missile. The acquisition, processing, and storage of phase history data 102 representing the imaged terrain is discussed in greater detail above in reference to FIG. 1.

FIG. 3b illustrates an image 116 formed based on selected operations of embodiments of the present invention. These operations and the image 116 are described in greater detail above in reference to FIG. 1. As shown here, the image 116 contains a number of trees and a missile, each having a different elevation than the imaged ground. Together, these objects and ground comprise an arbitrarily varying terrain.

Figure 4:
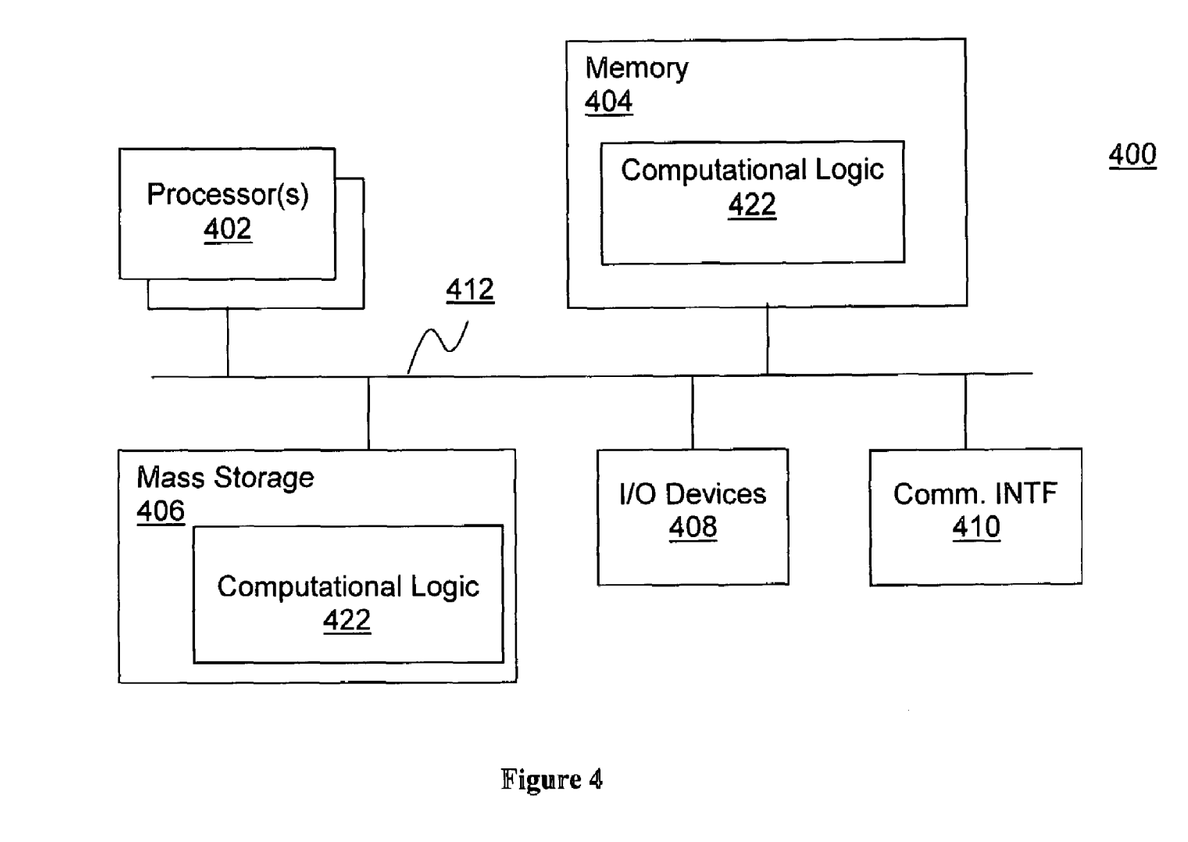
FIG. 4 illustrates an example computing device suitable for use to practice the present invention, in accordance with various embodiments.

FIG. 4 illustrates an example computing device suitable for use to practice the present invention, in accordance with various embodiments. As shown, computing device 400 includes one or more processors 402, and system memory 404. Additionally, computing device 400 includes mass storage devices 406 (such as diskette, hard drive, CDROM and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown).

Each of these elements performs its conventional functions known in the art. In particular, system memory 404 and mass storage 406 may be employed to store a working copy and a permanent copy of the programming instructions implementing an embodiment of the present invention or selected aspects, here shown as computational logic 422. The programming instructions may be implemented as assembler instructions supported by processor(s) 402 or high level languages, such as C, that can be compiled into such instructions.

The permanent copy of the programming instructions may be placed into permanent storage 406 in the factory, or in the field, through e.g. a distribution medium (not shown) or through communication interface 410 (from a distribution server (not shown)).

The constitution of these elements 402-412 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. Those with skill in the art will readily appreciate that the present invention may be implemented in a very wide variety of embodiments or extended therefrom. For example, in various embodiments, the system may also be extended to provide confidence metrics for the predictions. This application is intended to cover any adaptations or variations of the embodiments discussed herein. Therefore, it is manifestly intended that this invention be limited only by the claims and the equivalents thereof.

What is claimed is:

1. A method comprising:

receiving phase history data collected from synthetic aperture radar imaging of a terrain;

dividing the received phase history data into a plurality of subsets corresponding to a plurality of subaperture intervals;

computing for each of a plurality of points of the terrain, a contribution of each of the plurality of subaperture intervals, each contribution of a subaperture interval to a point including a magnitude and a phase calculated by interpolating the subaperture interval, using the corresponding subset of phase history interval data, and based at least in part on an arbitrary reference surface's elevation at the point;

summing for each of the plurality of points of the terrain, the contributions of the plurality of subaperture intervals; and forming an image of the terrain based at least in part on the summed contributions of the plurality of subaperture intervals to the plurality of points of the terrain.

2. The method of claim 1, further comprising performing a Fast Fourier Transformation on each subset of the plurality of subsets of phase history data, and the computing is performed using the transformed data.

3. The method of claim 2, wherein the contribution of each subaperture interval may be computed by interpolating the transformed data using the formula:

$$g_s(x, y) = \exp(ia_0 H(x, y) h(k_x, k_y)|_{c(s)})$$
$$g_s^0\left(x + a_0 H(x, y)\frac{\partial h(k_x, k_y)}{\partial k_x}\bigg|_{c(s)}, y + a_0 H(x, y)\frac{\partial h(k_x, k_y)}{\partial k_y}\bigg|_{c(s)}\right),$$

where x and y are slant-plane coordinates of a point of the imaged terrain, $g_s(x,y)$ is a contribution of a subaperture interval for a point of terrain (x,y), $a_0$ is a known constant, H(x,y) is an elevation of the arbitrary reference surface above or below a two-dimensional focus target plane at each point of terrain (x,y), $k_x$ is a fast-time index of the phase history data, $k_y$ is a slow-time index of the phase history data, $h(k_x,k_y)$ is an elevation of an airborne platform acquiring the collection of phase history data above the imaged terrain at a time at which the phase history data at $k_x$ and $k_y$ is acquired, and c(s) is a center of each subaperture interval.

4. The method of claim 1, wherein the receiving, dividing, computing and summing comprise an approximation to a matched filter, and the matched filter is approximated by a summation over the subaperture intervals, $$g(x, y) = \sum_s g_s(x, y),$$

where each subaperture interval is approximated as:

$$g_s(x, y) = \sum_{k_x, k_y \in interval} G(k_x, k_y)$$

-continued $$\exp\left(ia_0H(x,y)\left[\begin{array}{c}h(k_x,k_y)\Big|_{c(s)}+\frac{\partial h(k_x,k_y)}{\partial k_x}\Big|_{c(s)}k_x+\\ \frac{\partial h(k_x,k_y)}{\partial k_y}\Big|_{c(s)}k_y\end{array}\right]+\right),$$
$$ixk_x+iyk_y$$

where x and y are slant-plane coordinates of a point of the imaged terrain, $g_s(x,y)$ is a contribution of a subaperture interval for a point of terrain (x,y), $k_x$ is a fast-time index of the phase history data, $k_y$ is a slow-time index of the phase history data, $G(k_x,k_y)$ is the phase history data, $a_0$ is a known constant, $H(x,y)$ is an elevation of the arbitrary reference surface above or below a two-dimensional focus target plane at each point of terrain (x,y), $h(k_x,k_y)$ is an elevation of an airborne platform acquiring the collection of phase history data above the imaged terrain at a time at which the phase history data at $k_x$ and $k_y$ is acquired, and c(s) is a center of each subaperture interval.

5. The method of claim 1, wherein the arbitrary reference surface approximates the imaged terrain.

6. The method of claim 1, further comprising performing at least one preprocessing operation on the phase history data, the processing operation being selected from a group consisting of:
   a hardware distortion compensation operation,
   a Deskew processing operation,
   a fine motion effect compensation operation, and
   a polar-to-rectangular resampling operation.

7. The method of claim 1, further comprising repeating said computing and summing for at least one other arbitrary reference surface, and said forming is based at least in part on said computing and summing for a plurality of arbitrary reference surfaces.

8. An apparatus comprising:
   a processor; and
   a computing engine coupled to the processor and adapted to
      receive phase history data collected from synthetic aperture radar imaging of a terrain;
      divide the received phase history data into a plurality of subsets corresponding to a plurality of subaperture intervals;
      compute for each of a plurality of points of the terrain, a contribution of each of the plurality of subaperture intervals, each contribution of a subaperture interval to a point including a magnitude and a phase calculated by interpolating the subaperture interval, using the corresponding subset of phase history interval data, and based at least in part on an arbitrary reference surface's elevation at the point;
      sum for each of the plurality of points of the terrain, the contributions of the plurality of subaperture intervals; and
      form an image of the terrain based at least in part on the summed contributions of the plurality of subaperture intervals to the plurality of points of the terrain.

9. The apparatus of claim 8, wherein the computing engine is further adapted to perform a Fast Fourier Transformation on each subset of the plurality of subsets of phase history data, and perform the computing using the transformed data.

10. The apparatus of claim 9, wherein the contribution of each subaperture interval may be computed by interpolating the transformed data using the formula:

$$g_s(x,y) = \exp(ia_0H(x,y)h(k_x,k_y)|_{c(s)})$$
$$g_s^0\left(x+a_0H(x,y)\frac{\partial h(k_x,k_y)}{\partial k_x}\Big|_{c(s)}, y+a_0H(x,y)\frac{\partial h(k_x,k_y)}{\partial k_y}\Big|_{c(s)}\right),$$

where x and y are slant-plane coordinates of a point of the imaged terrain, $g_s(x,y)$ is a contribution of a subaperture interval for a point of terrain (x,y), $a_0$ is a known constant, $H(x,y)$ is an elevation of the arbitrary reference surface above or below a two-dimensional focus target plane at each point of terrain (x,y), $k_x$ is a fast-time index of the phase history data, $k_y$ is a slow-time index of the phase history data, $h(k_x,k_y)$ is an elevation of an airborne platform acquiring the collection of phase history data above the imaged terrain at a time at which the phase history data at $k_x$ and $k_y$ is acquired, and c(s) is a center of each subaperture interval.

11. The apparatus of claim 8, wherein the receiving, dividing, computing and summing comprise an approximation to a matched filter, and the matched filter is approximated by a summation over the subaperture intervals, $$g(x,y) = \sum_s g_s(x,y),$$

where each subaperture interval is approximated as:

$$g_s(x,y) = \sum_{k_x,k_y \in interval} G(k_x,k_y)$$
$$\exp\left(ia_0H(x,y)\left[\begin{array}{c}h(k_x,k_y)\Big|_{c(s)}+\frac{\partial h(k_x,k_y)}{\partial k_x}\Big|_{c(s)}k_x+\\ \frac{\partial h(k_x,k_y)}{\partial k_y}\Big|_{c(s)}k_y\end{array}\right]+\right),$$
$$ixk_x+iyk_y$$

where x and y are slant-plane coordinates of a point of the imaged terrain, $g_s(x,y)$ is a contribution of a subaperture interval for a point of terrain (x,y), $k_x$ is a fast-time index of the phase history data, $k_y$ is a slow-time index of the phase history data, $G(k_x,k_y)$ is the phase history data, $a_0$ is a known constant, $H(x,y)$ is an elevation of the arbitrary reference surface above or below a two-dimensional focus target plane at each point of terrain (x,y), $h(k_x,k_y)$ is an elevation of an airborne platform acquiring the collection of phase history data above the imaged terrain at a time at which the phase history data at $k_x$ and $k_y$ is acquired, and c(s) is a center of each subaperture interval.

12. The apparatus of claim 8, wherein the arbitrary reference surface approximates the imaged terrain.

13. The apparatus of claim 8, wherein the computing engine is further adapted to perform at least one preprocessing operation selected from a group consisting of:
   a hardware distortion compensation operation,
   a Deskew processing operation,
   a fine motion effect compensation operation, and
   a polar-to-rectangular resampling operation.

14. The apparatus of claim 8, wherein the computing engine is further adapted to repeat said computing and summing for at least one other arbitrary reference surface, and said forming is based at least in part on said computing and summing for a plurality of arbitrary reference surfaces.

15. An article of manufacture comprising:
a storage medium having a plurality of programming instructions stored therein, the plurality of programming instructions adapted to program an apparatus to enable the apparatus to
receive phase history data collected from synthetic aperture radar imaging of a terrain;
divide the received phase history data into a plurality of subsets corresponding to a plurality of subaperture intervals;
compute for each of a plurality of points of the terrain, a contribution of each of the plurality of subaperture intervals, each contribution of a subaperture interval to a point including a magnitude and a phase calculated by interpolating the subaperture interval, using the corresponding subset of phase history interval data, and based at least in part on an arbitrary reference surface's elevation at the point;
sum for each of the plurality of points of the terrain, the contributions of the plurality of subaperture intervals; and
form an image of the terrain based at least in part on the summed contributions of the plurality of subaperture intervals to the plurality of points of the terrain.

16. The article of claim 15, wherein the plurality of programming instructions are further adapted to enable the apparatus to perform a Fast Fourier Transformation on each subset of the plurality of subsets of phase history data, and to perform said compute using the transformed data.

17. The article of claim 16, wherein the contribution of each subaperture interval may be computed by interpolating the transformed data using the formula:

$$g_s(x, y) = \exp(ia_0 H(x, y) h(k_x, k_y)|_{c(s)})$$
$$g_s^0\left(x + a_0 H(x, y)\frac{\partial h(k_x, k_y)}{\partial k_x}\bigg|_{c(s)}, y + a_0 H(x, y)\frac{\partial h(k_x, k_y)}{\partial k_y}\bigg|_{c(s)}\right),$$

where x and y are slant-plane coordinates of a point of the imaged terrain, $g_s(x,y)$ is a contribution of a subaperture interval for a point of terrain (x,y), $a_0$ is a known constant, $H(x,y)$ is an elevation of the arbitrary reference surface above or below a two-dimensional focus target plane at each point of terrain (x,y), $k_x$ is a fast-time index of the phase history data, $k_y$ is a slow-time index of the phase history data, $h(k_x,k_y)$ is an elevation of an airborne platform acquiring the collection of phase history data above the imaged terrain at a time at which the phase history data at $k_x$ and $k_y$ is acquired, and c(s) is a center of each subaperture interval.

18. The article of claim 15, wherein the receiving, dividing, computing and summing comprise an approximation to a matched filter, and the matched filter is approximated by a summation over the subaperture intervals, $$g(x, y) = \sum_s g_s(x, y),$$

where each subaperture interval is approximated as:

$$g_s(x, y) = \sum_{k_x, k_y \in interval} G(k_x, k_y)\exp\left(ia_0 H(x, y)\left[h(k_x, k_y)|_{c(s)} + \frac{\partial h(k_x, k_y)}{\partial k_x}\bigg|_{c(s)} k_x + \frac{\partial h(k_x, k_y)}{\partial k_y}\bigg|_{c(s)} k_y\right] + ixk_x + iyk_y\right),$$

where x and y are slant-plane coordinates of a point of the imaged terrain, $g_s(x,y)$ is a contribution of a subaperture interval for a point of terrain (x,y), $k_x$ is a fast-time index of the phase history data, $k_y$ is a slow-time index of the phase history data, $G(k_x,k_y)$ is the phase history data, $a_0$ is a known constant, $H(x,y)$ is an elevation of the arbitrary reference surface above or below a two-dimensional focus target plane at each point of terrain (x,y), $h(k_x,k_y)$ is an elevation of an airborne platform acquiring the collection of phase history data above the imaged terrain at a time at which the phase history data at $k_x$ and $k_y$ is acquired, and c(s) is a center of each subaperture interval.

19. The article of claim 15, wherein the plurality of programming instructions are further adapted to enable the apparatus to perform at least one preprocessing operation selected from a group consisting of:
a hardware distortion compensation operation,
a Deskew processing operation,
a fine motion effect compensation operation, and
a polar-to-rectangular resampling operation.

20. The article of claim 15, wherein the plurality of programming instructions are further adapted to enable the apparatus to repeat said computing and summing for at least one arbitrary reference surface, and said forming is based at least in part on said computing and summing for a plurality of arbitrary reference surfaces.

* * * * *